United States Patent [19]

Lindbom

[11] 4,115,684
[45] Sep. 19, 1978

[54] PORTABLE, PROGRAMMABLE MANIPULATOR APPARATUS

[75] Inventor: Torsten H. Lindbom, Brookfield, Conn.

[73] Assignee: Unimation, Danbury, Conn.

[21] Appl. No.: 696,903

[22] Filed: Jun. 17, 1976

[51] Int. Cl.² ............................................. B23K 9/00
[52] U.S. Cl. ........................... 219/124.22; 214/1 CM; 219/124.34; 219/125.1; 228/7; 318/568
[58] Field of Search ............ 219/124, 125 R, 125 PL, 219/124.22, 124.34, 125.1; 228/7, 8; 318/567, 568, 569, 603; 235/151.11 M; 33/141 R, 141.5, 142, 174 PC; 234/75; 214/1 CM

[56] References Cited

U.S. PATENT DOCUMENTS

| | | | |
|---|---|---|---|
| 3,497,959 | 3/1970 | Engelsman | 33/142 |
| 3,555,239 | 1/1971 | Kerth | 219/125 R |
| 3,648,143 | 3/1972 | Harper et al. | 318/568 |
| 3,689,892 | 9/1972 | Glenn et al. | 318/568 |
| 3,757,187 | 9/1973 | Arai | 318/568 |
| 3,826,383 | 7/1974 | Richter | 214/1 CM |
| 3,843,915 | 10/1974 | Helmbold | 318/603 |
| 3,943,343 | 3/1976 | Irie | 214/1 CM |
| 4,014,495 | 3/1977 | Oda et al. | 219/124 |
| 4,030,617 | 6/1977 | Richter | 214/1 CM |

Primary Examiner—J. V. Truhe
Assistant Examiner—Clifford C. Shaw
Attorney, Agent, or Firm—Mason, Kolehmainen, Rathburn & Wyss

[57] ABSTRACT

A manipulator apparatus having a manipulator arm movable in a plurality of axes is programmed to perform a desired sequence of operations over a desired path. The programming is accomplished by an operator manually moving the end of the manipulator arm over the desired path while encoders associated with each axis of the manipulator apparatus produce signals representing movement of the arm in each of the axes. The encoder signals are automatically recorded at predetermined increments of movement of the arm as command signals for controlling movement of the arm during a playback cycle. Recording of these command signals is controlled by a guide wheel which is positioned on the end of the arm during programming and is rotated by maintaining the wheel in contact with the work as the operator moves the manipulator arm over the desired path. Control pulses are generated for each predetermined increment of rotation of the guide wheel and these control pulses are employed to control recording of the encoder output signals. Weld cycle controls, weld speed controls and a manual record control are provided. The manual record control is actuated to record positions between welds wherein the end effector is moved between weld paths without the guide apparatus being in contact with the welding work surfaces. During programming, guide strips having tracks into which the guide apparatus is placed, may be positioned along the desired weld path by the operator. The recorded signals corresponding to the distances the arm is to be moved in each of said axes are utilized during a playback cycle to control drive apparatus for each axis, such as stepping motors, which are de-energized during the programming phase. During playback a welding tip or other implement is positioned in place of the guide wheel apparatus whereby the manipulator performs the desired operation over the programmed path at a predetermined, selectable speed independent of the programming speed. The recorded command signals are effective to drive pulse generation circuitry during playback to produce pulse trains that are supplied to the stepping motors so that they are moved at the required velocities to perform a weld over the programmed path.

33 Claims, 9 Drawing Figures

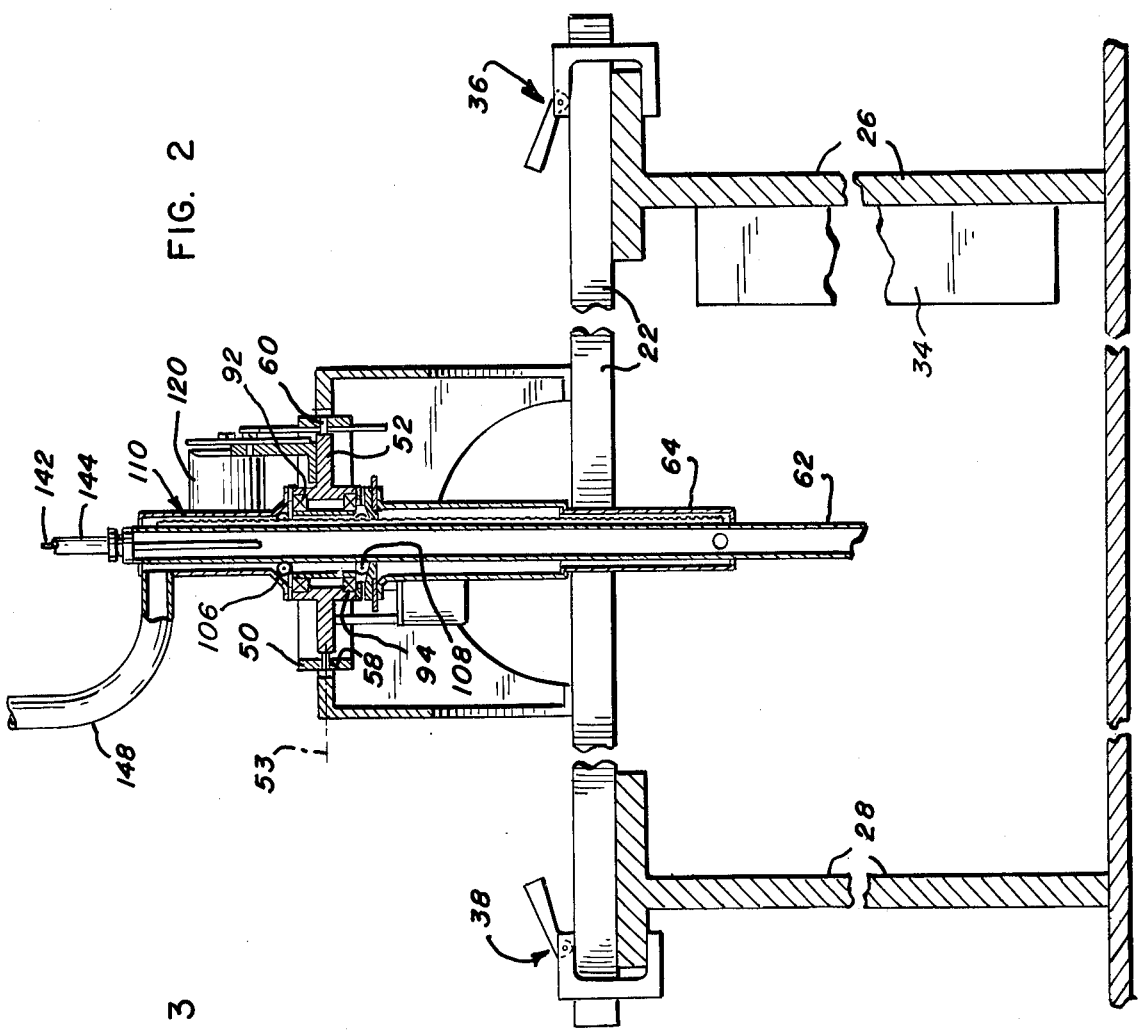
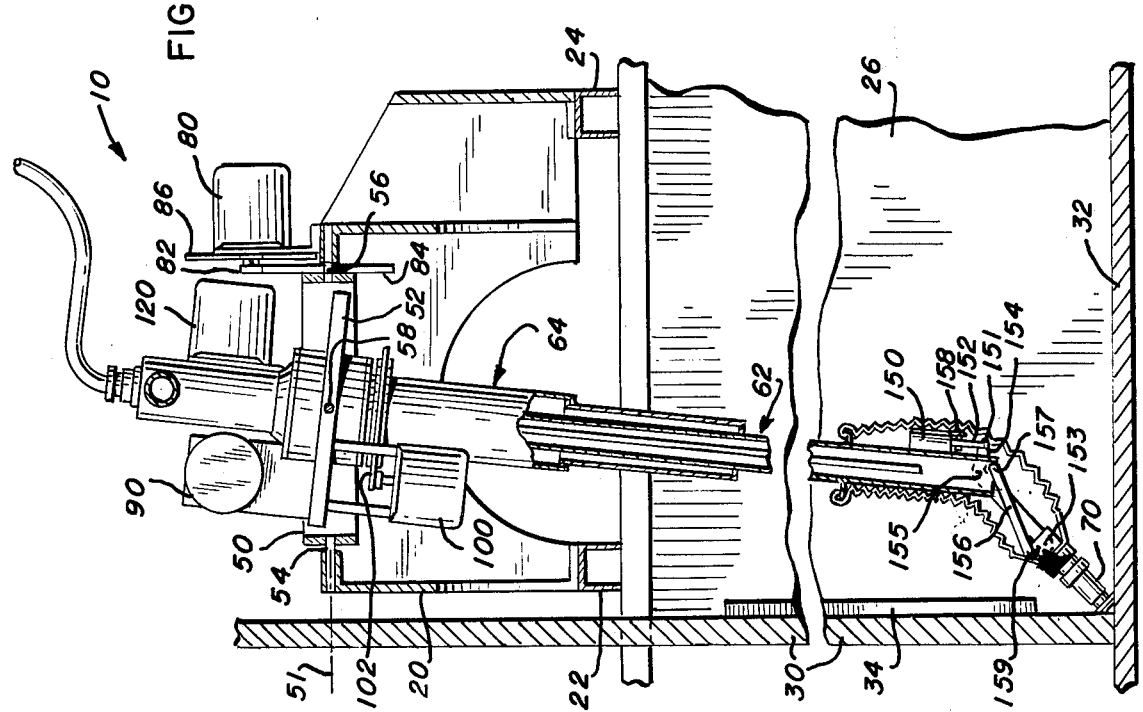

FIG. 8
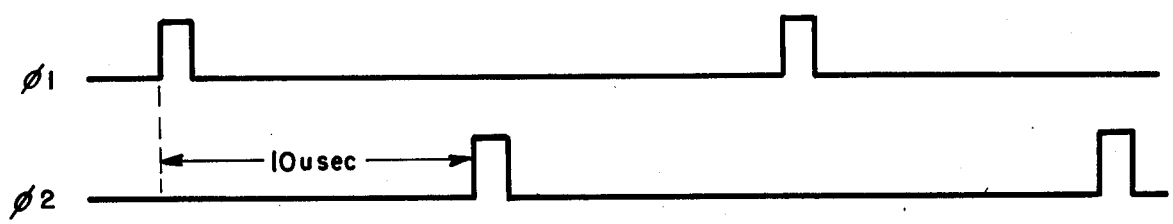
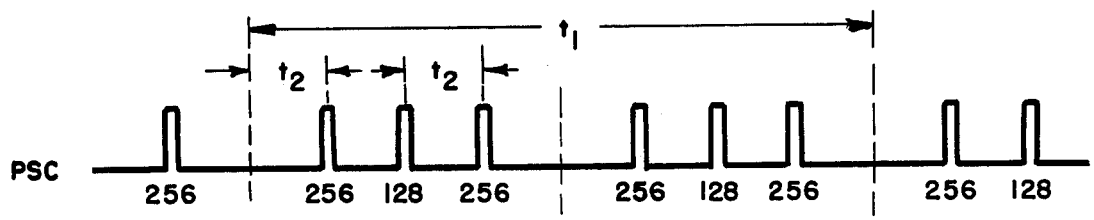
FIG. 9

PORTABLE, PROGRAMMABLE MANIPULATOR APPARATUS

BACKGROUND OF THE INVENTION

A. Field of the Invention

The present invention relates to manipulator apparatus, and more particularly, to manipulator apparatus which may be manually programmed by an operator moving the apparatus through a series of operations to automatically record data derived from encoder signals associated with each axis of the manipulator. The recorded data is read out during a playback mode to control movement of the apparatus. The recording during programming is under the control of a rotating guide apparatus positioned at the manipulator end effector during programming.

B. Description of the Prior Art

Programmed manipulator apparatus utilizing various programming techniques have been developed for work operations such as welding, assembly and repetitive work cycles. While these arrangements have in general, been satisfactory for their intended purpose, they are usually not readily portable because of their substantial weight and hence are usually employed to do repetitive tasks at one location. While some prior art manipulators have been mounted on rails for limited movement, even these arrangements are not suitable for work over large areas such as in the interior welding of ship hulls, longitudinal stiffener supports and bulkheads. In such an environment there is a need for a lightweight, portable manipulator apparatus which can be readily moved to a given area, clamped in position, programmed by manually moving the end of the manipulator arm over a desired welding path in that area, and then operated automatically to make the weld while the operator programs another similar manipulator for welding in an adjacent area. Such portable manipulators can conveniently be supported on the longitudinal stiffener supports of the ship's hull and slid along these longitudinals to different work areas associated with the transverse bulkheads which are to be welded to the longitudinals and the ship bottom. Prior art manipulator apparatus has not been capable of performing such task because of the massive base portions of such apparatus which are necessary when the manipulator arm is used to move heavy articles from one place to another. Furthermore, the drive trains of such prior art apparatus are of such large step-down ratios that it is very difficult if not impossible to move the encoders associated with each axis by driving backward through these drive trains if an attempt is made to move the manipulator arm manually over a desired programming path. Usually such prior art manipulators are programmed by selectively energizing driving motors in the different axes by means of push buttons on a so-called teach gun, the operator holding down one or more buttons until he visually determines that a desired position has been reached.

In order to be suitable for such portable ship-building applications, the drive motors must be light in weight and must also be capable of being accurately operable at very low speeds while still exhibiting high output torque to overcome the load of the manipulator arm due to gravity and forces from welding cables and associated equipment during playback. Further, the manipulator apparatus of the prior art does not have a geometrical design of the rotational axes and center of rotation to minimize loading forces on the drive system which is desirable in applications of manual programming.

SUMMARY OF THE INVENTION

It is, therefore, a primary object of the present invention to provide a new and improved manipulator apparatus which avoids one or more of the above-described disadvantages of prior art arrangements.

It is another object of the present invention to provide a new and improved lightweight, portable manipulator apparatus wherein an operator may program the apparatus over a desired path by manually moving the end of the arm with a minimum of effort.

It is a further object of the present invention to provide a new and improved manipulator apparatus wherein encoders associated with each axis of the manipulator produce pulses for each predetermined increment of movement of the arm in each of the axes as an operator moves the end of the arm over the desired work path and a rotatable wheel on the end of the arm develops control pulses for each predetermined increment of movement of the arm, these control pulses being utilized to effect recording of the encoder signals which are then used as command signals during playback to move the manipulator apparatus over the programmed path.

It is still a further object of the present invention to provide a manipulator apparatus movable in a plurality of axes under the control of stepping motors which is positioned above a work volume and pivotally mounted for movement in a gimbal system which is portable and is easily maneuverable during programming by an operator with the stepping motors de-energized.

In accordance with one aspect of the invention, the manipulator arm, with lightweight stepping motors for each axis, is separated from the control system portion of the apparatus to provide a lightweight portable assembly which may be slid along the longitudinals of a ship to successive welding locations and may be clamped in place at each desired location. The upper end of the arm is mounted in a gimbal type support so that the lower end of the arm may be readily moved to cover a desired work volume below the assembly. Relatively low step-down ratio gear trains are employed between the stepping motors and the arm so that when these motors are de-energized and the end of the arm is manually moved over a desired path the rotors of these motors are driven back through the gear trains in direct proportion to movement in each axis. Encoders associated with each rotor are used as sources of command signals as the arm is moved manually. During manual programming a rotatable guide wheel is positioned on the end of the arm and is rotated by engagement with the work as the arm is moved over the desired path. Rotation of this guide wheel causes the generation of control pulses for each predetermined increment of movement of the end of the arm. These control pulses are employed to control storage of the encoder signals in a suitable memory. During playback, the end of the arm carries a weld tip or gun and the stored command signals are employed to control energization of the stepping motors so that the arm is moved over the desired programmed path.

The invention both as to its organization and method of operation, together with further objects and advantages thereof, will best be understood by reference to the following specification taken in connection with the accompanying drawings.

BRIEF DESCRIPTION OF THE DRAWINGS

FIG. 2 is an enlarged front elevational view partly in section and with parts of the manipulator apparatus of FIG. 1 removed;

FIG. 3 is an enlarged side view partly in section and with parts of the manipulator apparatus of FIG. 1 removed;

FIGS. 8 and 9 are timing diagrams illustrating signals at various points in the control circuit of FIG. 7.

BRIEF DESCRIPTION OF THE PREFERRED EMBODIMENT

Figure 1:
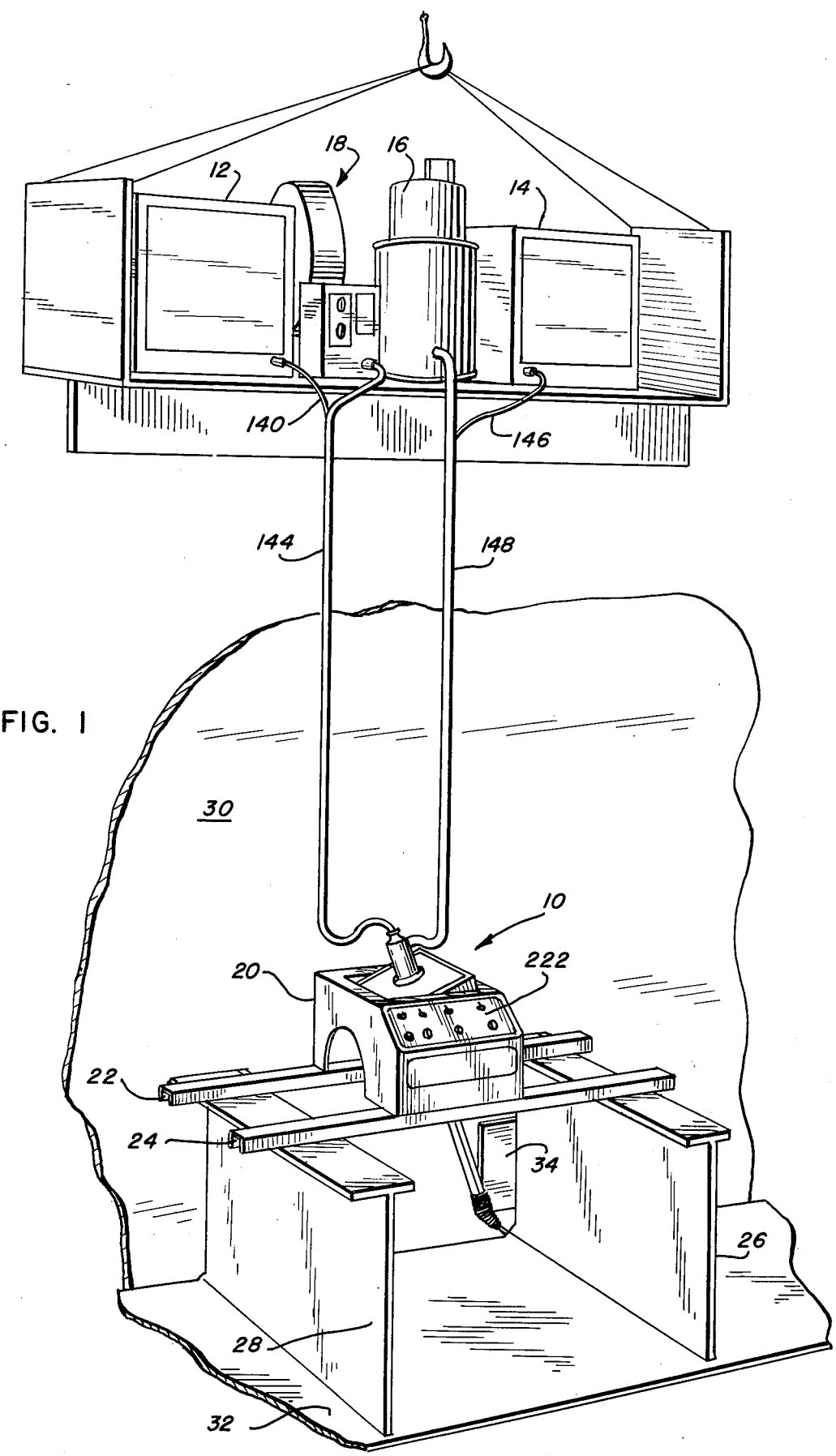
FIG. 1 is a perspective view of a manipulator apparatus embodying the features of the present invention shown in connection with a work surface to be welded.

Referring now to the drawings, and more particularly to FIGS. 1 through 3, the manipulator apparatus of the present invention referred to generally as 10 is therein illustrated along with the control system 12, a welding power supply 14, a vacuum extraction system 16 and a welding wire supply assembly 18 which are all suspended on a platform above the manipulator 10 by a hoist or the like.

The manipulator 10 is mounted within the frame 20 which is supported by and connected to rails 22 and 24 positioned transversely across longitudinal stiffener supports 26 and 28 which are generally planar members having a T-rail cross section. The longitudinal stiffener supports 26 and 28 and numerous similar supports are spaced at regular intervals throughout the hulls of ships and transverse bulkheads 30 are lowered down over the longitudinals 26, 28 at spaced intervals and must be welded to the hull 32 and the longitudinals 26, 28 by means of plates 34. Various weld patterns are necessary along these edges for proper mechanical integrity of the ship construction. Specifically, a plate 34 is positioned with its planar surface against the bulkhead and an edge abutting the longitudinal stiffener 26 with the edges of the plate 34 being welded to the adjoining surfaces. As best seen in FIG. 2, the support rails 22 and 24 are temporarily secured to the longitudinal stiffener supports 26, 28 by means of removable clamp members 36 and 38. The manipulator apparatus is clamped between adjacent longitudinal stiffener supports and predetermined programmed weld patterns are performed within the working volume defined by members 26, 28, 30 and 32. After the desired weld patterns are completed between two particular longitudinal supports, the manipulator apparatus 10 is unclamped and may be moved to another location to accomplish the same welding pattern or be reprogrammed at the new location to perform a desired pattern for that area.

Figure 4:
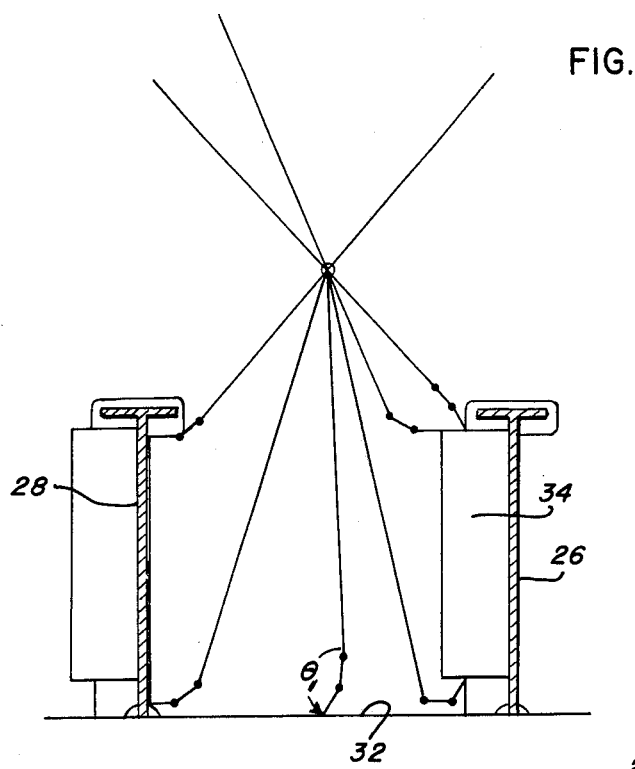
FIG. 4 is a geometrical representation of various working positions and orientations of the manipulator apparatus of FIGS. 1 through 3 shown in connection with a typical working environment defining a work volume or envelope.

In accordance with an important aspect of the present invention and referring additionally to FIG. 4, the manipulator 10 includes five axes or degrees of freedom in a polar coordinate system to facilitate movement within the working envelope and to eliminate any problem associated with the axes of the manipulator apparatus interferring with each other when reaching into corners. The manipulator apparatus 10 employs a basic gimbal system comprising gimbal rings 50 and 52 with ring 50 being pivotably mounted within the housing 20 by pivot pins 54 and 56 for movement about a first axis 51 and ring 52 pivotably mounted within ring 50 to rotate about an axis 53 perpendicular to that of axis 51 of ring 50 about pivot pins 58 and 60. In addition to the gimbal roll axis formed by rotation of ring 50 about axis 51 and the gimbal pitch axis formed by rotation of ring 52 about axis 53, the manipulator arm 62 is movable in a rotary axis by rotation of the central arm support sleeve 64 within gimbal ring 52 with the rotary central arm support sleeve 64 being supported by suitable bearings within ring 52. The fourth axis or degree of freedom is provided by the extension and retraction (in-out axis) of the manipulator arm 62 and the fifth axis is accomplished by the articulated weld nozzle or end fitting 70 being rotated about the arm 62 which is mounted at the outermost portion of the arm 62. The arm 62 can therefore rotate around its own longitudinal axis and pivot around two mutually perpendicular axes. The basic gimbal geometry of the manipulator minimizes external loading forces on the drive system.

The gimbal roll axis rotation is accomplished by drive motor 80 supported by the frame 20 and is connected to rotate ring 50 about axis 51 at pivot points at 54 and 56 through a gearing arrangement with a motor drive gear 82 engaging a driven sector gear 84 connected to the ring 50. The drive motor 80 also includes a rotary shaft encoder 86 which may comprise a photoelectric disc encoder having two channels. The encoder 86 may be either an incremental encoder producing output pulses representative of incremental distances traversed by the particular axis or an absolute position encoder as will be discussed in detail hereinafter. The gear ratio of gear 84 to gear 82 is 36:1 in a specific embodiment so that a minimum amount of force is required to move the manipulator arm with the drive sources de-energized during manual programming as will be explained in detail hereinafter.

Considering the gimbal pitch axis, ring 52 is rotated about axis 53 and pivot pins 58 and 60 within the ring 50 by means of a drive motor 90 supported and carried by ring 50 through a sector gearing arrangement not shown in detail.

The central arm support sleeve 64 rotates within gimbal ring 52 to accomplish the rotary axis movement within upper and lower ball bearings 92 and 94. The arm sleeve 64 is rotated by a rotary drive motor 100 carried by gimbal ring 52 through a gearing arrangement 102 not shown in detail which includes a driven gear positioned about the circumference of sleeve 64.

Considering now the movement of the manipulator arm extension 62 in the in and out (retraction-extension) axis, arm 62 is supported within support sleeve 64 by roller bearings 106 and 108. Movement of the arm 62 is accomplished by a rack and pinion drive 110 driven by a drive motor 120 which is carried by the support sleeve or housing 64.

The drive motors 90, 100 and 120 each have an associated encoder similar to the encoder 86 connected to the shaft of drive motor 80. The drive motors 80, 90, 100 and 120 in a specific embodiment are stepping motors of the variable-reluctance type to benefit from the low weight, high torque characteristics and the high accuracy driving capabilities of stepping motors in application where slow speeds are generally encountered. Further, the variable-reluctance stepping motor has essentially no holding torque when de-energized in contrast to a permanent magnet type stepping motor. The absence of holding torque in the variable-reluctance motor is a desirable feature in programming, with the drive motor de-energized, wherein the operator moves the manipulator arm through a desired path by grasping the outermost portion of the arm 62 and essentially backdrives the drive train in a "free-wheeling" mode.

Figure 7:
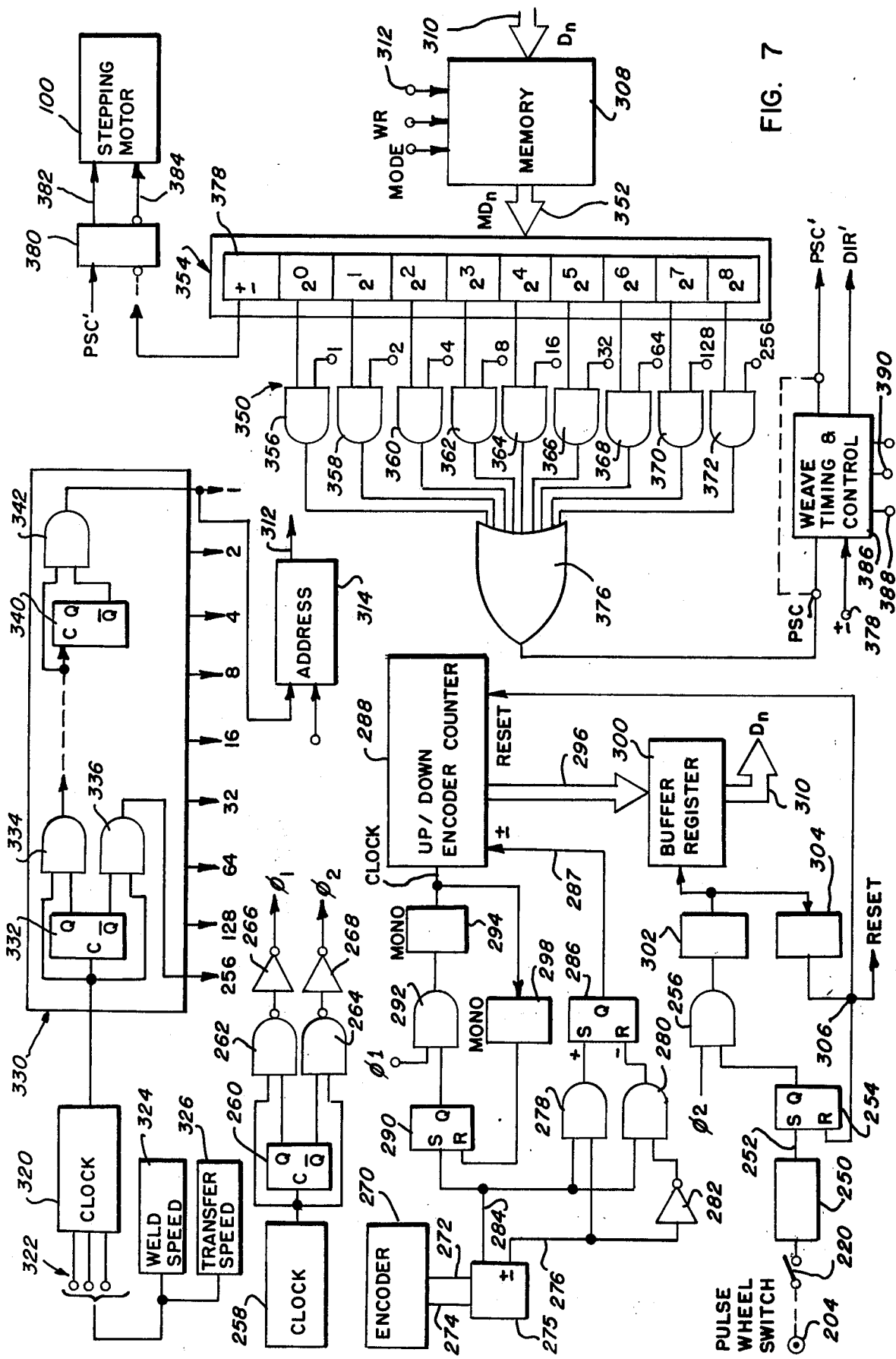
FIG. 7 is a block and logic diagram of the control system of the apparatus of FIGS. 1 through 3.

The high torque and accuracy at slow speeds of the stepping motor, as opposed to DC servo motors, allows for a lower gear ratio in the drive trains which also aids in backdriving the drive train manually. The stepping motor also is capable of highly accurate and predictable performances at very slow speeds wherein DC servo motors have difficulty in maintaining a uniform slow speed due to torque variation resulting from uneven magnetic flux and commutator error. The speed of operation during the welding playback of the manipulator may be as slow as one revolution of a particular axis in fifteen minutes. The particular stepping motor utilized may have as many as 400 steps per revolution and a drive train gear ratio of 36 to 1 in a particular rotational axis would result in 14,400 stepping pulses for the stepping motor to complete one revolution of the controlled axis to achieve accurate control at low speeds. The high torque capabilities of the DC stepping motors are adequate to overcome loading on the arm and forces from the weld cable. The control of the stepping motors will be discussed in detail hereinafter in connection with the manipulator control circuitry 12 as shown in FIG. 7. The stepping motors generally are controlled by supplying a stream of pulses to one control lead to produce rotation of the motor by a predetermined amount in a first direction and by applying the pulse stream to a second control lead to produce rotation in the opposite direction.

The manipulator arm 10 is connected to the control housing or console 12 by a multi-cable control bus 140 which enters the back of the arm 62 and is connected to the various drive motors and encoders as well as welding controls housed in the frame 20 to control welding speed and patterns.

The welding wire 142 (FIG. 2) is fed from the welding wire reel and feeding assembly 18 through a hollow weld wire tube 144 and down through the center of the arm 62 to the weld nozzle 70. A weld current conducting cable 146 is connected from the weld power supply 14 through the arm 62 and extends down through the arm to the weld nozzle and enters the side of the arm at its back end along with a hollow tube 148 to provide a passage for the extraction of weld gases accumulating in the vicinity of the weld nozzle tip 70. The nozzle orientation or articulation is controlled by a small DC motor and linear actuator 150 which is connected through a mechanical linkage arrangement to the nozzle tip. The orientation of the weld nozzle 70 is controlled by the actuator 150 to be maintained within acceptable angular limits for conventional welding procedures to align the weld wire 142 to its natural curvature and for proper weld and drag angles. The actuator 150 includes a high gear reduction driving system that drives a linear output member 152 connected at pivot point 151 to rotate one end of a pivoted linkage arm 154 about its pivot 155 on the arm 62 having an opposite extending portion of the linkage connected at pivot 153 to the weld nozzle 70. A linkage arm 156 connected between another pivot point 157 on the arm 62 and to the nozzle 70 at pivot point 159 provides a synchronized two-jointed control system for the weld nozzle 70. A linear potentiometer 158 is mounted to be slidably and operably engaged by the linear plunger 152 to provide an analog indication of the movement of the plunger. The variations in resistance of the potentiometer 158 are utilized to provide a digitized output to the control circuitry 12 through a conventional A/D (analog to digital) converter representing either absolution position or incremental change.

Referring now to FIG. 4, and considering the geometrical dimensions and movements of the manipulator apparatus, it is necessary to achieve various limiting positions in welding within the work envelope, as illustrated, and bounded by the longitudinal stiffener supports 26 and 28, the hull bottom 32 and the bulkhead 30. In a specific application, the height of stiffener supports 24 and 26 are 820 mm. and are spaced 1,030 mm. apart. The center of the gimbal rings 50 and 52 is located approximately 1,200 mm. above the surface 32. To accomplish the welding patterns as bounded by the six manipulator arm positions illustrated, the axis limitations are an in-out arm stroke of 590 mm., a gimbal roll rotation of 98°, a gimbal pitch rotation of 30°, an arm rotation of 130° and a nozzle deflection ranging between 56° and 152° as measured from the longitudinal axis of the arm $\theta_1$ in FIG. 4.

Figure 5:
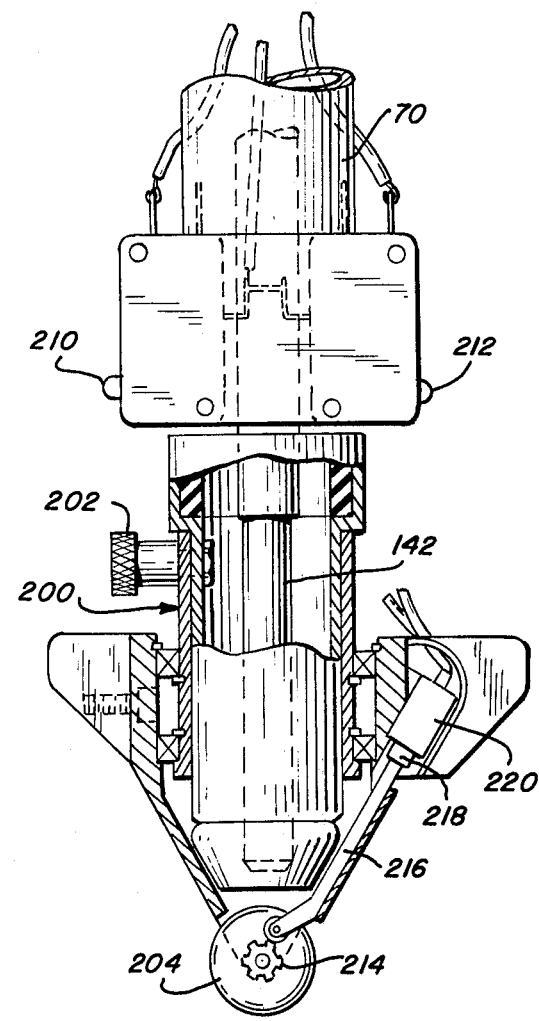
FIG. 5 is an enlarged front elevational view partly in section of the portion of the end of the manipulator arm of the manipulator apparatus of FIGS. 1 through 3 having a guide assembly positioned on the end of the arm for use in the manual programming of the manipulator apparatus.
Figure 6:
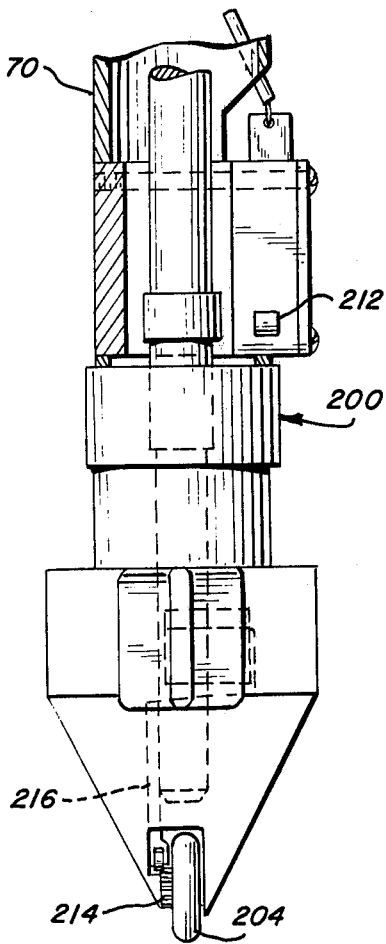
FIG. 6 is a side view partly in section of the end of the manipulator arm and guide assembly of FIG. 5.

Considering now the programming of the manipulator apparatus over the desired weld paths to be automatically accomplished in playback, a guide assembly referred to generally as 200 (FIG. 5) is fitted onto the weld nozzle 70 of arm extension 62 in place of the weld gun or tip utilized during playback. A thumbscrew 202 is provided to secure the guide assembly 200 to the nozzle 70. A guide wheel 204 is rotatably attached to the assembly 200 and the dimension of the assembly 200 and wheel 204 are arranged to position the outer edge of the guide wheel 204 at the same position at which the weld gun tip is oriented during welding accounting for all clearances and in accord with conventional welding practices.

The programming is accomplished by an operator manually moving the weld nozzle 70 with attached guide assembly 200 and orienting the guide wheel 204 along the desired path and in rotating engagement with the various surfaces of the ship. During this manual movement, the gimbal roll, gimbal pitch, rotary and in-out axes are all free wheeling with the drive motors de-energized and the nozzle angle articulation axis is controlled by the operator through control of the linear actuator motor 150 by means of push buttons 210 and 212 which control the direction of movement of the linear actuator. The change in the weld angle $\theta_1$, however, changes very slowly so that only minimal control of this axis is necessary during the programming of the weld path. The resistance to bending of the weld wire 142 and associated wire guiding structure make the powered manipulation of the nozzle angle necessary as opposed to a manually adjustable articulation angle. To facilitate programming, the start point of the weld may, if desired, be marked on the ship structure with a suitable indicator and a strip with a track adapted to accept the guide wheel 204 may be placed by the operator along the desired weld path. During programming, the operator maintains the guide wheel 204 within the track.

As the guide wheel 204 rotates, a cam or cog wheel 214 fixably carried by the guide wheel 204 engages an actuator arm 216 that activates a push button 218 of a microswitch 220 also carried by the guide assembly 200. Actuation of the switch 220 is utilized to control the recording of the positional data for each of the manipulator axes. The number of teeth or cogs on the wheel 214 and circumference of the guide wheel 204 determine the distance traversed along the weld path between recorded data points. In one specific embodiment, data is recorded for every 0.1 inch of distance along the weld path wherein the wheel 204 has an outer circumference of one inch and the cog wheel 214 has ten teeth. A second embodiment utilizes a guide wheel with a circumference of two inches and a cog wheel with ten teeth to record data every 0.2 inches. In any case, it will be understood that various combinations or ratios of circumference of wheel 204 to the number of teeth in wheel 214 may be utilized to achieve recording at desired incremental distances as accuracy and the specific application requires. As the manipulator arm and the various axes are moved, the encoder for each axis produces data representative of the changing position in the respective axes so that the data may be stored in a memory of the control circuitry 12 each time a record position is indicated by switch 220.

If incremental encoders are utilized for the four main axes, gimbal roll, gimbal pitch, rotary and in-out, the data in the form of pulses between recorded points will be representative of the distance or positional change of each axis between recorded points. Correspondingly, if absolute position encoders are utilized, the data at the recorded points will represent the absolute position of each axis at each recorded point. In any case, the operator by manually moving the manipulator and engaging the guide wheel 204 to rotate over the weld path causes the automatic recording of data by the control circuitry 12, as will be explained in detail hereinafter. This data is recalled from the memory to perform the weld along the programmed path during playback. It should be understood that the speed at which the operator moves the manipulator arm and guide wheel is completely unrelated to playback or weld speed and variations in programming speeds from weld to weld or over a single weld path is also irrelevant to playback performance or speed since data is automatically recorded on an incremental positional change basis along the weld paths and is read out to the drive trains at a predetermined adjustable playback speed.

A control panel 222 is provided on the manipulator apparatus 10 with an end of program control, a weld speed control, a start weld control, stop weld control and a weld current control along with an auxiliary record control which may also be located remotely to the apparatus such as in a hand-held unit. The auxiliary record control is utilized to record positional data when the guide wheel 204 is not in rotating engagement with the welding surfaces. This is necessary when the manipulator arm is traversing from the end of one weld path to the beginning of the next successive weld to be performed in the same playback weld cycle. At the end of a weld path, the arm is moved away from the weld surface, the position is recorded by actuating the auxiliary record control and the manipulator arm is moved to the start of the next weld path whereupon the auxiliary record control is again actuated to record this position. The guide wheel 204 is then moved over the weld path by the operator with data being automatically recorded. The operator proceeds in the above manner to program the manipulator over all the desired weld paths within the working envelope bounded by the adjacent longitudinal stiffener supports.

The operator, after the programming is accomplished, now moves the manipulator arm to the desired starting point of the first weld path, sets the various weld controls to the desired speed and current, replaces the guide assembly 200 with the weld gun tip and places the apparatus in the playback weld mode. The operator may then leave the area to program another apparatus or inspect the program of other manipulators operating in the weld mode. In some applications, due to the dangerous confined toxic weld gas products, the operator may program a group of manipulators and place them all in the playback mode simultaneously and then leave the area. When the desired weld patterns have been performed within a given working envelope, the manipulator apparatus may be repositioned to a new work area by unclamping toggle members 36 and 38 on each of the support rails 22 and 24 secured to the manipulator apparatus 10 and relocating the apparatus and reclamping the members 36 and 38.

Depending upon the uniformity of work envelopes (ship dimensions) and the precision of placement of the manipulator, it may not be necessary to re-program the apparatus for identical weld paths at a different location. It should also be understood that various support structures may be utilized to orient the manipulator apparatus in the vicinity of the work structure and that numerous other applications are possible in addition to ship welding.

During the programming, metal or plastic strips with tracks for the guide wheel 204 may be utilized to account for the width of the weld when programming a multiple pass (multiple weld) to provide proper spacing of the welds. During the playback of multiple passes on a single weld path, the operator will very likely need to remove the slag formed from the first weld before allowing the manipulators to complete a second weld pass wherein a stop program command may be provided and the program restarted by the operator.

Considering now the control electronics 12 and referring to FIG. 7, as the operator moves the guide wheel 204 along the weld path, switch 220 closes momentarily for each predetermined incremental positional change along the weld path. The switch 220 is connected to a pulse generator and shaping stage 250 which provides a short duration pulse such as 1 usec. upon each closure of the switch 220. The pulse at the output 252 of pulse generator stage 250 is utilized to latch a flip-flop 254 at the set input S. The Q output of flip-flop 254 is connected to one input of a two input AND gate 256 with the second input being connected to a timing signal $\phi 2$ of the two phase clock 258 utilized to provide the unambiguous and synchronized recording of data during the programming mode. The clock 258 is a conventional free-running oscillator operating at a nominal frequency of 100 Khz which drives the clock input of a flip-flop 260 and also one input of each of two input NAND gates 262 and 264. The Q output of the flip-flop 260 is connected to the second input of gate 262 and the $\overline{Q}$ output is connected to the second input of gate 264. The output of gate 262 is connected through an inverter gate 266 to provide the $\phi 1$ or first phase clock signal, FIG.

8, which is a train of pulses having an approximate pulse duration of 1 usec. and a period or pulse spacing of 20 usec. The output of gate 264 is connected through an inverter gate 268 to provide the φ2 or a second phase clock signal which is also a train of pulses having an approximate pulse duration of 1 usec. and a period of 20 usec. but which are offset in time or phase from the φ1 pulse train by one-half the pulse train period of 10 usec. which is also one period of the clock 258.

The clock signal φ1 is utilized to control a counter for each axis which accumulates the number of pulses received from the encoders of the respective axes between the pulses generated by rotation of the guide wheel indicating completion of each incremental distance. The accumulated count in each counter is provided to a buffer register in each axis with the contents of the buffer register being recorded into the memory upon the generation of an incremental completion pulse signal under the control of the φ2 clock signal. The counter for each axis is then reset to accumulate encoder incremental positional pulses for the next interval of guide wheel movement.

The control circuitry common to each axis will be described in detail for the rotary axis with identical circuitry being provided for each of the other axes except as otherwise noted. The encoder for each axis, such as the encoder 270 for the rotary axis, produces pulses on two output lines 272 and 274, which are offset in time from each other. The encoder includes two channels such that a pulse is generated for each incremental positional change on each channel output line 272 and 274 which occur in a predetermined timed relationship. Such a two-channel incremental encoder arrangement may be achieved by positioning two separate photo-encoded disc encoders on the same drive motor shaft or by the provision of two readout assemblies spaced apart from each other.

In any case, if the encoder is rotated in a first direction, clockwise for example, a pulse is generated on line 272 before the pulse on line 274 indicating a positional incremental change in that axis in the clockwise or positive direction. Conversely, if rotation takes place in the counterclockwise direction, then the pulse on output channel 274 leads the pulse on line 272. The channel outputs 272 and 274 for each encoder are connected to an encoder decoding and timing stage 275 provided for each respective encoder. The direction decoding and timing stage 275 generates a sign output 276 which is a high logic level when the encoder is rotating in a positive direction and a low logic level when the encoder is rotating in a negative direction. The sign output 276 is provided to one input of a two-input AND gate 278 and also to one input of another two-input AND gate 280 through an inverter gate 282. A second output 284 of the encoder direction decoding and timing stage 275 provides a short duration 1 usec. pulse, for example, whenever the encoder produces a pulse on each of the output lines 272 and 274 indicating an incremental change in rotation. The incremental pulse output 284 is connected to the second input of each of the gates 278 and 280. The output of gate 278 is connected to the set input of a sign storage latch 286 and the output gate 280 is connected to the reset input of latch 286. The output of the latch 286 is connected to the up/down control 287 of the up/down counter 288 for each axis.

The incremental pulse signal 284 is also connected to the set input of a flip-flop 290 with the output of flip-flop 290 being connected to one input of a two-input AND-gate 292. The second input of the gate 292 is connected to the φ1 clock signal and the output of gate 292 drives a monostable multivibrator stage 294 which provides a count pulse at its output to the clock input of the up/down counter 288 upon the occurrence of the timing signal φ1 and the generation of an incremental pulse signal 284. Depending upon the logic state of the up/down control 287, the counter 288 will either increment or decrement one count on the binary counter state output lines referred to generally as 296. The output of mono stage 294 also triggers a reset mono stage 298 with the output monostage 298 being connected to the reset input of flip-flop 290. Thus, the flip-flop 290 is reset after each incremental pulse is counted.

The binary accumulated counter state 296, representing the incremental displacement of the rotary axis, is provided to a buffer register 300 which is strobed by the output of a monostable multivibrator stage 302 under the control of the φ2 clock signal through gate 256. The output of monostage 302 is also utilized to trigger a reset monostable stage 304 with the output 306 of the monostage 304 being connected to the reset input of latch 254 and also to the reset input of the counter 288 as well as to the counters of each of the other axes. Upon the generation of the strobe transfer signal from monostage 302, the buffer stores the accumulated counter state 296. Thus, the buffer register 300 for each of the axes now contains the data representing the respective incremental encoder movement since the previous 0.1 inch incremental positional change pulse representing the relative change in each axis for that 0.1 inch increment of manipulator end effector travel. The contents of the buffer register 300 for all axes is then transferred to the memory 308 at a particular address location on data bus lines 310 referred to generally as Dn. The address at which the particular data is to be recorded is controlled by an address control output 312 of an Address Control and Timing stage 314. The control output 312 may be a multiple data bus representing a binary coded address. The address control 312 is incremented by a timing input 313 to advance by one address step after the writing into memory is completed from the buffer registers under the control of the write signal WR which may be generated at any time after the buffer registers have been strobed and before the next incremental pulse is generated from stage 275. The timing input may be a signal derived as a time delayed signal of the WR signal. The mode signal corresponding to a write or read state is controlled by a switch on the control panel 222 of the manipulator frame 20.

The clock phase signals φ1 and φ2 ensure that a recording into memory operation is not initiated simultaneously with the occurrence of an encoder pulse which would contribute ambiguities to the binary recorded data.

In this manner, the accumulated count of encoder pulses from each encoder upon the occurrence of each incremental guide wheel pulse representing 0.1 inch of travel are recorded into memory in sequential order at a particular address. In playback, the recorded data is read out at a predetermined adjustable rate to provide the desired incremental positional change in each axis shaft to reproduce the desired weld paths and patterns with the proper synchronized operation of the weld gun by control of the drive motors for the axes. The recorded binary number at a particular address location for a particular axis represents the speed or number of incremental positional changes to be accomplished within a unit program time interval for that respective axis.

Considering the nozzle articulation axis, the output of the associated analog to digital converter may be recorded into the memory 308 directly whereupon the use of an up/down counter 288 and the encoder decoding stage 275 is not required for this axis. Similarly if absolute position encoders are utilized, the encoder outputs could also be directly recorded and in playback a number of pulses could be produced equal to the difference of successive recorded positions.

Considering now the detailed operation of the playback controls, a program clock 320 is utilized to control the generation of data pulses to the stepping drive motors 80, 90, 100, 120 and 150. The clock 320 operates at a nominal frequency of 512 pulses per second, in a specific embodiment, and the frequency is programmable on coded control lines 322 by either the weld speed control stage 324 or the transfer speed control stage 326. The output pulse train of the clock, at a nominal 512 pulses per second, drives a pulse train distribution generator or counter stage 330 which includes nine stages to produce nine respective pulse train outputs referred to generally as the 256, 128, 64, 32, 16, 8, 4, 2 and 1 pulse per second outputs. Each of the nine pulse train outputs comprises a pulse train of pulses equally spaced in time and offset in phase from each of the other pulse trains. The pulse generator stage 330 is discussed as including nine stages to produce nine pulse trains corresponding to a playback command capacity of 512 pulses to the stepping motor of each axis per unit of program time (each program step). This is consistent with a maximum capacity of the up/down counter 288 of 9 binary bits for accumulation of 512 pulses maximum from each of the encoders. If a stepping motor in a particular axis is controlled to rotate one complete revolution by 400 command pulses, for example, and the gear ratio from the motor to the driven axis is 36 to 1, this corresponds to 14,400 pulses for one complete axis revolution. Similarly, the encoder for the particular axis would produce 14,400 pulses for one complete revolution of the manipulator axis. A maximum of 512 pulses corresponds to approximately 13° of rotation of the axis. For a maximum movement of ten inches, for example, in a particular axis for 13° of rotation, the pulse rate would be approximately 51 pulses per inch of travel. It should be understood, that various degrees of revolution can be obtained which directly varies the distance traversed for a particular counter capacity. In any case, the only limiting criterion of concern is that no more pulses should be produced than the capacity of the counter 288 between successive pulses from the pulse generator stage 250. The maximum capacity of the counters 288 also limits the distances to be traversed between recorded points when the operator is moving the manipulator arm from the end of one weld path to the start of another. Thus, counter capacity should be provided to accommodate the largest distances to be traversed between recorded points. Further, to alleviate any inconveniences in programming, an automatic auxiliary record control may be provided to automatically record data points in the transfer mode as the counter reaches maximum capacity.

Considering now the pulse train generator and distribution stage 330, the output of the program clock 320 is connected to the clock input of a first stage flip-flop 332 and also to one input of a two-input AND-gate 334, the second input of the gate 344 being connected to the Q output of the flip-flop 332. The output of gate 334 is connected to the clock input of the second stage flip-flop which is not shown. The Q output of the first stage flip-flop 332 is connected to one input of a two-input AND-gate 336; the second input of gate 336 is connected to the clock input of flip-flop 332. The output of gate 336 is the 256-pulse-per-second first stage output. Similarly the second through eighth stages of pulse distribution generator 330 are similarly connected in the form of the first stage comprising flip-flop 332 and gates 334 and 336 to provide the pulse train outputs, 128, 64, 32, 16, 8, 4 and 2 pulses per second. The ninth stage of pulse distribution generator 330 is connected to the output gate of the eighth stage, corresponding to gate 334 of the first stage, at the clock input of the ninth stage flip-flop 340. The Q output of flip-flop 340 is connected to one input of a two-input AND-gate 342 and the second input is connected to the clock input of the flip-flop 340. The output of gate 342 is the 1-pulse-per-second output.

The nine pulse train outputs of pulse generator stage 330 are provided to a command pulse generator or interpolator referred to generally as 350. A command pulse generator 350 is provided for each of the axes to respectively drive each stepping motor 80, 90, 100, 120 and 150. The operation of such a circuit is similar to that described in detail in U.S. Pat. No. 3,069,608 which issued to J. W. Forrester et al on Dec. 18, 1962.

The recorded memory data, $MD_n$ referred to generally as 352 is read out of the memory 308 under the control of the address signal 312 which in playback is controlled through address stage 314 by the 1-pulse-per-second ninth stage output of stage 330. The read-out of data for each axis may be performed on a multiplex basis or simultaneous parallel read-out or by other conventional methods to a register 354 for each of the axes which stores the data during the current program step in nine binary stages $2^0$ through $2^9$ and a direction bit 378 indicating whether the data is to control the respective stepping motor in the positive or negative sense. Each of the $2^0$ through $2^9$ stages of the register 354 are connected respectively to one input of one of a series of nine command pulse control two-input AND-gates 356 through 372. The second input of each of the gates 356 through 372 are each respectively connected to one of the pulse train outputs 1, 2, 4, 8, 16, 32, 64, 128 or 256.

The outputs of the gates 356 through 372 are each connected to one input of a nine-input OR-gate 376 whose output is the pulse step command (PSC) signal producing the number of pulses or step commands to control the stepping motor, such as motor 100 in the rotary axis, to rotate the desired amount equivalent to the desired positional change in the rotary axis during the particular current program step. For example, referring to FIG. 9, if the rotary axis stepping motor is to be moved by an amount corresponding to 384 pulse step commands, 384 pulses will be produced on the PSC control line. The data in the register stages $2^0$ through $2^9$ would then comprise logical 0's in the $2^0$ through $2^6$ stages and logical 1's in the $2^7$ and $2^8$ stages so that gates 370 and 372 would be controlled to produce the 128 and 256 pulse-per-second pulse trains to gate 376 with the output of gate 376, PSC, combining the 128 and 256 pulse-per-second pulse trains. The waveform of FIG. 9 illustrates a portion of the PSC pulse train to step the motor 100 three hundred eighty-four times. The 128-pulse-per-second waveform occurs between alternate pulses in the 256 pulse per second waveform such that over a representative time period $t_1$, six step command pulses are produced over eight $t_2$ pulse time intervals where $t_2$ is the period of the 512-pulse-per-second clock waveform. A respective direction stage 378 of register 354 is connected to a respective motor control stage 380 along with a respective PSC signal for the gimbal roll, gimbal pitch, in-out and nozzle articulation axes. The motor control stage 380 provides two outputs 382 and 384 which are connected to the stepping motors 80, 90, 120 and 150. The step commands equal in number to the PSC pulses will occur on the plus direction output 382 if the sign of register stage 378 corresponds to the positive sense and on the minus direction output 384 if the sign of register 378 corresponds to a negative indication. The stepping motors in the positive sense direction when the step command pulses which are transformed by stage 380 to proper drive levels occur on the output 382 and in the negative sense when the step command pulses appear on output 384.

Considering the rotary axis, the vertical weld paths may be accomplished with a superimposed weaving signal in playback although the vertical weld paths are programmed in the normal manner except that a weave control on the control panel 222 is actuated. To this end, a weave timing and control stage 386 is provided to combine an adjustable (selected by weave pattern frequency and amplitude control inputs 388 and 390) waveform and the puls and minus signal from register stage 378 along with the PSC signal to generate a weaving control signal PSC' at the output of stage 386 and a direction signal DIR' that are provided to motor control stage 380.

The timing of weave control stage 386 may be performed in a manner similar to that of the control of the counter 288 and buffer 300 by the $\phi 1$ and $\phi 2$ clock signals. In this way the PSC signals and the weave signals may be combined under the control of a timing signal such as the 512-pulse-per-second output of clock 320 to derive the timing control.

While there has been illustrated and described a single embodiment of the present invention, it will be apparent that various changes and modifications thereof will occur to those skilled in the art. It is intended to cover all such changes and modifications as fall within the true spirit and scope of the present invention.

What is claimed as new and desired to be secured by Letters Patent of the United States is:

1. A portable welding system for use in shipbuilding and the like, comprising a frame, means for clamping said frame in position above a predetermined work area, a manipulator arm pivotally mounted in said frame for movement in a plurality of axes and having an end portion extending into said work area, motive means for moving said arm in each of said axes, a welding gun positioned on said end of said arm, means for disabling said motive means so that said arm may be manually moved over a desired welding path in said work area, means operative during said manual movement of said arm over said desired welding path for recording a series of digital signals corresponding to the position of said arm in each of said axes at different points along said desired welding path, and playback means controlled by said recorded digital signals for controlling said motive means to move said welding gun over said desired welding path.

2. The system of claim 1, wherein said welding gun has a tip portion for making a weld, and said means for developing a series of digital signals includes guide means adapted to be substituted for said tip portion and arranged to develop control pulses for each predetermined increment of movement of said end portion along said desired welding path, and means controlled by said control pulses for recording said series of digital signals.

3. The system of claim 2, wherein said guide means comprises a guide wheel which is substituted for said welding gun tip portion and is arranged to be moved over said desired welding path by rolling engagement with the object to be welded, and pulse generator means responsive to rotation of said guide wheel for developing said control pulses.

4. The combination of claim 1, which includes means operative during a playback cycle for moving said end portion of said manipulator arm transversely of said welding path in accordance with a predetermined weave pattern.

5. In a programmable manipulator, the combination of, a manipulator arm, a drive train for moving said manipulator arm in a plurality of axes, encoder means associated with said drive train for each axis, motive means for each of said drive trains and operative to move said arm in the respective axes in response to electrical input signals, means for disabling said motive means so that said arm may be manually moved to any desired point in a given work volume while said encoder means are driven through said drive trains, means for deriving successive command signals from said encoder means during said manual movement of said arm, means for storing said command signals, and means controlled by said stored command signals for controlling said motive means to move said arm over a path corresponding to said manual movement.

6. The combination of claim 5, wherein said drive trains have relatively little inertia, thereby to facilitate manual movement of said arm to any given point in said work volume.

7. The combination of claim 5, wherein said motive means comprises a stepping motor for each of said axes, said encoder means being connected to the shaft of each stepping motor and operative to develop said successive command signals as said stepping motor shafts are mechanically driven through said drive trains in response to said manual movement of said arm.

8. The combination of claim 7, wherein said stepping motors are of the type which produce no holding torque when deenergized thereby to minimize inertial forces to be overcome during said manual movement.

9. The combination of claim 5, which includes a frame, means for clamping said frame at a desired location above said given work volume, and means for pivotally mounting said manipulator arm in said frame so that the free end of said arm may be moved to any desired point within said work volume.

10. The combination of claim 9, wherein said mounting means comprises a gimbal-type support for the upper end of said arm.

11. The combination of claim 9, wherein said mounting means comprises an outer gimbal ring pivotally mounted on said frame for movement about a first axis, an inner gimbal ring pivotally mounted on said outer gimbal ring for movement about a second axis perpendicular to said first axis, and means for mounting said manipulator arm on said inner gimbal ring.

12. The combination of claim 11, which includes means for rotating said manipulator arm about the longitudinal axis thereof and relative to said inner gimbal ring.

13. The combination of claim 11 wherein said manipulator arm includes an upper portion mounted on said inner gimbal ring, and a coaxial end section, and means for linearly moving said end section relative to said upper portion.

14. The combination of claim 13, which includes a welding gun mounted on said end section.

15. The combination of claim 5 further comprising means independent of said stored command signals for controlling said motive means to move said arm transversely of said path in accordance with a predetermined pattern.

16. The combination of claim 5, which includes a welding gun tip carried by said manipulator arm, and means for modifying said command signals so that said motive means moves said welding gun tip laterally of said path in accordance with a predetermined weave pattern as said welding gun tip is moved along said path.

17. The combination of claim 5 wherein said movtive means includes means for rotating said manipulator arm about the longitudinal axis thereof, means for generating a weave control signal, and means controlled by said weave control signal during a playback cycle for controlling said rotating means to move said arm laterally of said path in accordance with a predetermined pattern.

18. In a programmable manipulator, the combination of, a manipulator arm movable in a plurality of axes, motive means for moving said arm in each of said axes, encoder means connected to each of said axes, means for disabling said motive means so that said arm may be manually moved over a desired path in a given work volume while said encoder means remain connected to said axes, means for developing a series of control pulses while said one end of said arm is manually moved over said desired path, said control pulses corresponding to predetermined increments of movement along said desired path, means controlled by said control pulses for storing successive command signals derived from said encoder means, and means controlled by said stored command signals for controlling said motive means to move said arm over said desired path.

19. The combination of claim 18 wherein said control pulse developing means comprises a guide wheel arranged to be rolled over said work surface.

20. The combination of claim 19, which includes a work head positioned on the end of said manipulator arm, and means for detachably securing said guide wheel to said work head in such position that when said guide wheel is rolled over a work surface said work head is in predetermined relation to said work surface.

21. The combination of claim 20, wherein said guide wheel is removed from said work head during movement of said arm over said given path under the control of said stored command signals.

22. The combination of claim 18, which includes means for supporting said arm for movement in a plurality of axes which intersect at a point which is located above the work volume to be traversed by said arm.

23. The combination of claim 18, which includes a driving motor for each of said axes, gear means interconnecting said encoder means with the shaft of each of said driving motors, whereby movement of said arm over said predetermined path while said driving motors are de-energized is effective to move said encoder means.

24. The combination of claim 23, wherein said driving motors are stepping motors, said controlling means including means responsive to each of said stored command signals for developing a train of pulses spaced in time and quantitatively representing the stored command signal, and means for supplying said trains of pulses to said stepping motors during a playback cycle, thereby to move said arm over said desired path.

25. The combination of claim 23, wherein said gear means has a relatively small step-down gear ratio to facilitate movement of said encoder means in response to manual movement of said arm while said driving motors are de-energized.

26. The combination of claim 18, wherein said encoder means produce an encoder pulse for each predetermined increment of movement of said arm in each of said axes.

27. The combination of claim 26, which includes means for preventing said control pulses from occurring simultaneously with said encoder pulses.

28. The combination of claim 26, which includes counter means for each axis and arranged to receive the pulses developed by said encoder means and means responsive to each of said control pulses for storing the count in said counter means and resetting said counter means.

29. The combination of claim 28, which includes means for developing two streams of pulses, the pulses in said first stream being noncoincidental with the pulses in said second stream, means for gating said encoder pulses to said counter only during coincidence with a pulse in said first stream, and means for actuating said storing and resetting means only in coincidence with a pulse in said second stream.

30. In a programmable manipulator, the combination of, a manipulator arm, means for moving said manipulator arm in a plurality of axes, encoder means connected to each of said axes, means for disabling said moving means so that one end of said arm may be moved over a desired path in a given work volume by means independent of said moving means while said encoder means remain connected to said axes, means for deriving successive command signals from said encoder means during said movement over said desired path, means for storing said command signals, and means controlled by said stored command signals for controlling said moving means to move said arm over said desired path during a playback cycle.

31. The combination of claim 30, which includes guide means at said one end of said arm and arranged to develop control pulses for each predetermined increment of movement of said one end of said arm, and means controlled by said control pulses for deriving said successive command signals from said encoder means.

32. The combination of claim 30, which includes a guide wheel positioned on said arm and arranged to be rolled over a work surface, pulse generator means associated with said guide wheel and arranged to produce a control pulse for each predetermined increment of rotation of said guide wheel, and means controlled by said control pulses for deriving said successive command signals from said encoder means.

33. The combination of claim 30, which includes means operative while said arm is moved over said desired path during a playback cycle for modifying movement of said one end of said arm in accordance with a predetermined pattern.

* * * * *